United States Patent [19]
Cooley

[11] 3,836,868
[45] Sept. 17, 1974

[54] LASER GLASS HOST COMPOSITIONS COMPRISING $TeO_2$, $B_2O_3$ ZnO

[75] Inventor: Richard F. Cooley, Toledo, Ohio

[73] Assignee: Owens-Illinois, Inc., Toledo, Ohio

[22] Filed: June 27, 1973

[21] Appl. No.: 373,905

[52] U.S. Cl. ............................ 331/94.5, 252/301.4
[51] Int. Cl. ............................................. H01s 3/16
[58] Field of Search ..... 331/94.5; 252/301.4, 301.6; 106/47

[56] References Cited
UNITED STATES PATENTS
3,462,707  8/1969  Pearson et al. ..................... 331/94.5

Primary Examiner—William L. Sikes
Attorney, Agent, or Firm—Richard D. Heberling; E. J. Holler

[57] ABSTRACT

Laser glass host compositions for effective lasing amounts of $Nd_2O_3$ are disclosed, the host compositions comprising $TeO_2$, $B_2O_3$ and ZnO in certain molar proportions. Also disclosed are methods of making highly effective laser articles, such as rods and discs, and the new use of the above-described glass compositions for forming laser articles, the new use including forming laser articles from the compositions, pumping the resultant laser articles to provide an energy inversion, and lasing the pumped article.

14 Claims, 1 Drawing Figure

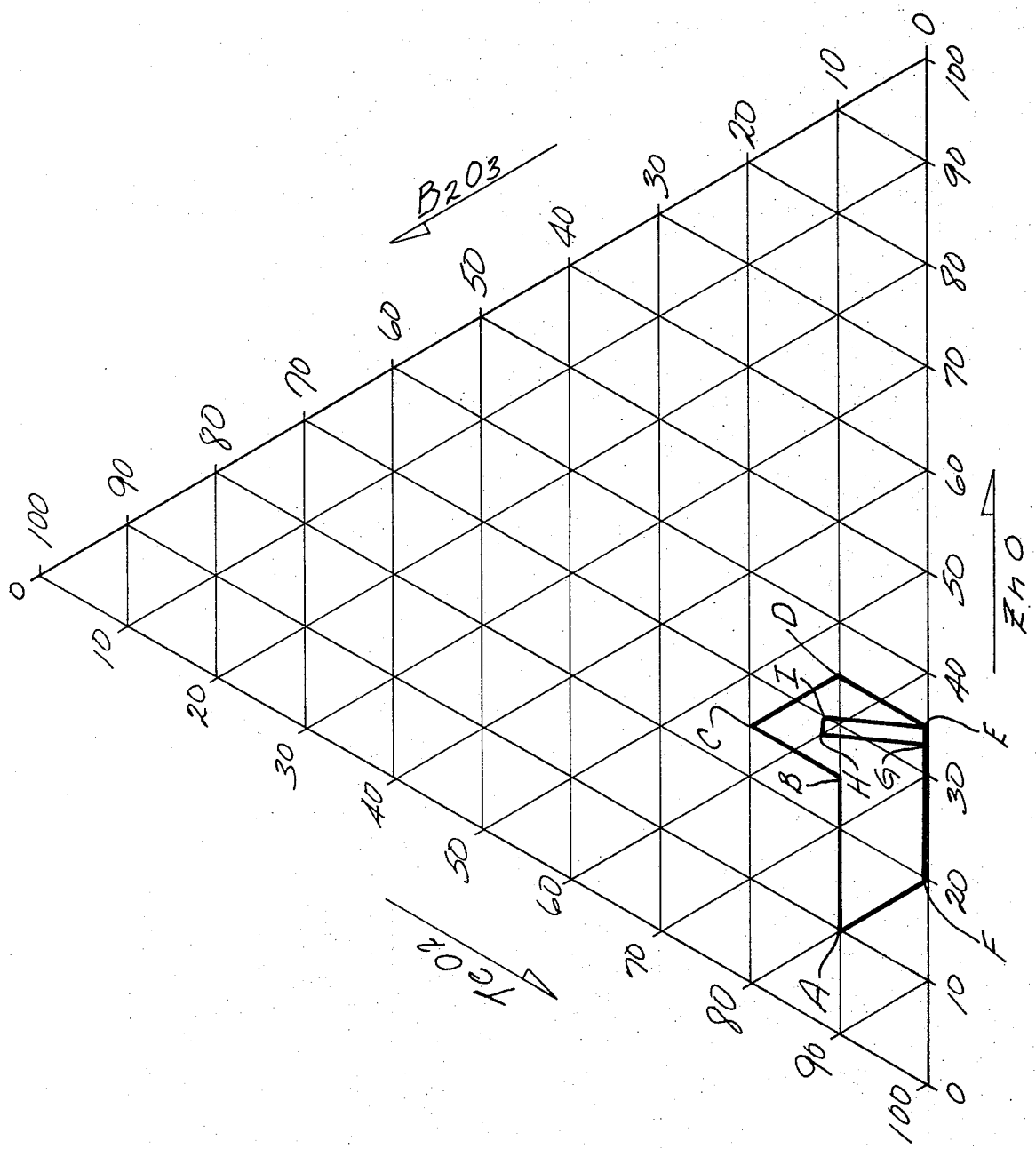

LAER GLASS HOST COMPOSITIONS COMPRISING TeO₂, B₂O₃ AND ZnO

The present invention relates to glass host compositions for effective lasing amounts of $Nd_2O_3$, the host compositions comprising $TeO_2$, $B_2O_3$ and ZnO in certain molar amounts. The present invention also relates to methods of making laser articles, including rods and discs, the methods including forming laser articles from the glass compositions containing certain amounts of $TeO_2$, $B_2O_3$ and ZnO. The methods include the steps of melting laser glass batch-forming materials to provide a molten glass containing certain amounts of $TeO_2$, $B_2O_3$ and ZnO, the molten glass capable of acting as a host for an effective lasing amount of $Nd_2O_3$; forming a glass blank from the molten glass; and fabricating the laser articles from the blank.

The present invention also relates to the new use of $TeO_2/BaO/ZnO$ glass compositions for making glass laser articles, the new use including making the laser articles from the compositions, pumping the articles and lasing the pumped articles.

It is desirable to provide improved laser glass compositions that can be used to make outstanding, highly-efficient glass laser articles. It is also desirable to provide methods of making the highly efficient articles and also to provide the new use for glass compositions comprising $TeO_2$, $B_2O_3$ and ZnO in which the new use comprises forming a glass article from the above-described glass composition, which includes an effective lasing amount of $Nd_2O_3$; pumping the laser article; and lasing the pumped article.

It is an object of the present invention to provide a laser glass composition comprising $TeO_2$, $B_2O_3$ and ZnO in which the proportions of $TeO_2$, $B_2O_3$ and ZnO, in molar amounts, are defined in a general range by the area within the heavy lines connecting the points ABCDEF of the ternary diagram of the Figure, the glass composition being a host for an effective lasing amount of $Nd_2O_3$.

It is an object of the present invention to provide a method for making a glass article such as a laser rod, disc or the like in which the method comprises the steps of:

1. melting laser glass batch-forming materials to provide a molten glass comprising $TeO_2$, $B_2O_3$ and ZnO, in which the molar proportions thereof are defined by the area within the heavy lines connecting the points ABCDEF of the ternary diagram of the Figure, the molten glass being a host for an effective lasing amount of $Nd_2O_3$;

2. forming a glass laser blank from the molten glass; and 3. fabricating a laser article from the blank to provide an efficient laser article.

It is an object of the present invention to provide the new use for a glass composition as a glass laser article in which the glass comprises $TeO_2$, $B_2O_3$ and ZnO in certain molar proportions and in which the glass composition is a host for an effective lasing amount of $Nd_2O_3$, the new use comprising the steps of:

1. forming a glass laser article from the glass composition comprising $TeO_2$, $B_2O_3$ and ZnO along with the effective lasing amount of $Nd_2O_3$;

2. pumping the laser article to provide an energy inversion; and 3. lasing the pumped article.

It is an object of the present invention to provide a highly efficient glass laser article made from a glass composition comprising $TeO_2$, $B_2O_3$ and ZnO, and containing an effective lasing amount of $Nd_2O_3$.

These and other objects will become apparent from the specification that follows, the appended claims, and the drawings, in which the FIGURE is a ternary diagram of the glass host composition of the present invention in which the molar proportions of $TeO_2$, $B_2O_3$ and ZnO are defined by the areas within the heavy lines of the ternary diagram.

The present invention provides outstanding laser glass host compositions for effective lasing amounts of $Nd_2O_3$, the host compositions comprising $TeO_2$, $B_2O_3$ and ZnO in certain molar amounts that are defined in a general range by the area within the heavy lines connecting the points ABCDEF of the ternary diagram of the FIGURE of the drawings. Preferred molar amounts of $TeO_2$, $B_2O_3$ and ZnO are defined by the area within the heavy lines connecting the points GHIE in the ternary diagram.

The present invention also provides methods for making highly efficient glass laser articles, the methods including the steps of:

1. melting laser glass batch-forming materials to provide a molten glass comprising $TeO_2$, $B_2O_3$ and ZnO in which the molar amounts thereof are defined in a general range by the area within the heavy lines connecting the points ABCDEF of the ternary diagram, the molten glass capable of functioning as a host for an effective lasing amount of $Nd_2O_3$;

2. forming a glass laser blank from the molten glass; and 3. fabricating the laser articles from the glass laser blank.

The present invention also provides the new use for a glass composition as a glass laser article in which the glass comprises $TeO_2$, $B_2O_3$ and ZnO, in which the molar proportions thereof are defined in a general range within the area formed by the heavy lines connecting the points ABCDEF of the ternary diagram, and in which the glass composition is a host for an effective lasing amount of $Nd_2O_3$, the new use comprising the steps of:

1. forming a glass laser article from the glass composition comprising $TeO_2$, $B_2O_3$ and ZnO; with an effective lasing amount of $Nd_2O_3$;

2. pumping the laser article to provide an energy inversion; and 3. lasing the pumped laser article.

A zinc tellurite glass that consists essentially of a major molar proportion of $TeO_2$ and between about 20 and 40 molar percent of ZnO is described and claimed in the Redman U.S. Pat. No. 3,423,326. These zinc tellurite glasses are reported as having fluorescent activity when doped with $Nd_2O_3$.

As previously indicated, the outstanding $TeO_2/B_2O_3/ZnO$ glass laser host compositions of the present invention unexpectedly exhibit much higher fluorescent activity than the zinc tellurite glasses of U.S. Pat. No. 3,423,326, the increased fluorescent activity indicating a greater lasing efficiency for the laser article made from the host compositions of the present invention. As previously described, only certain molar proportions of $TeO_2$, $B_2O_3$ and ZnO can be used to provide the highly efficient laser articles. The increase in fluorescent activity, when compared to the working examples of U.S.

Pat. No. 3,423,326, is generally at least about 50 percent or even as much as about 60 or 70 percent.

also for convenience, weight percent, with 30 ml. of water.

| Ingredients | Mole Percent | | Weight Percent | |
|---|---|---|---|---|
| | Host Glass | Laser Article | Host Glass | Laser Article |
| $TeO_2$ | 80.0 | 79.5 | 89.5 | 87.9 |
| ZnO | 10.0 | 9.9 | 5.1 | 5.6 |
| $B_2O_3$ | 10.0 | 9.9 | 5.4 | 4.7 |
| $Nd_2O_3$ | — | 0.7 | — | 1.8 |

In the previously mentioned Redman U.S. Pat. No. 3,423,326, there is no mention of any glass system other than that of the glass host composition that consists essentially of tellurium oxide and zinc oxide. There is no suggestion in the Redman patent that highly efficient laser articles can be made from a host composition containing only certain molar proportions of $TeO_2$, $B_2O_3$ and ZnO.

Suitable laser glass host compositions of the present invention generally contain about 55–80 mole percent $TeO_2$, about 0.2–20 mole percent $B_2O_3$ and about 10–35 mole percent ZnO, the host composition containing an effective lasing amount of $Nd_2O_3$.

The outstanding laser glass host compositions of the present invention preferably contain about 58–67 mole percent $TeO_2$, about 0.2–12 mole percent $B_2O_3$ and about 28–34.8 mole percent ZnO, the host composition containing an effective lasing amount of $Nd_2O_3$, which is preferably about 0.01–1.5 mole percent.

Excellent results have been obtained with glass laser compositions, such as those in which the host glass comprises about 80 mole percent $TeO_2$, 10 mole percent $B_2O_3$ and 10 mole percent ZnO; a glass comprising 60 mole percent $TeO_2$, 12 mole percent $B_2O_3$ and about 28 mole percent ZnO; and a glass comprising about 55 mole percent $TeO_2$, about 20 mole percent $B_2O_3$ and about 25 mole percent ZnO.

In accordance with the present invention, increased lasing efficiency is obtained for glass laser rods and discs in which the increase in fluorescent activity surprisingly is at least about 50 percent higher than that of a zinc tellurite glass containing 65 mole percent $TeO_2$ and 35 mole percent ZnO, and at least about 50 percent higher than that of a lithia-calcia-alumino silicate laser rod as set forth in U.S. Pat. No. 3,471,409 to Lee and Rapp, in which the glass has the following approximate composition in mole percent:

| Ingredient | Mole Percent |
|---|---|
| $SiO_2$ | 60 |
| $Al_2O_3$ | 2.5 |
| $Li_2O$ | 27.5 |
| CaO | 10 |
| $Nd_2O_3$ | 0.5 |

Generally, the highest fluorescent intensity value for a zinc tellurite glass, as above-described containing 35 mole percent ZnO, is about 2.09, and the highest fluorescent intensity value of the above-described lithia-calcia-alumino silicate glass laser, which is the reference laser glass, held to be 1.0.

The following examples are intended to illustrate the present invention and not to limit the same in any way.

EXAMPLE 1

PART A

A 15 gram melt was prepared by mixing reagent grade raw materials, in the following molar percent and also for convenience, weight percent, with 30 ml. of water.

The slurry was mixed for 10 minutes and poured into a gold crucible. The crucible was placed in an air circulating oven with the temperature maintained at 110°C. overnight to remove the water. The crucible was then placed in an electric resistance furnace with the temperature at 750°C. for 3 hours, or until homogenous, after which the molten glass immediately poured into a preheated (260°C.) graphite mold forming a disc having an 11/16 inch diameter and ¼ inch thickness. The graphite mold was placed in an annealing oven maintained at 340°C. After 1 hour, at 340°C., the temperature of the annealing oven was lowered at a rate of 38°C. per hour to 250°C. after which the annealing oven was turned off and the mold cooled to room temperature.

The solid, annealed glass disc was removed from the mold, wet ground and polished with close tolerance to a thickness of 0.195 inches and a diameter of 0.687 inches. The refractive index of the finished polished glass disc was measured to be 2.08.

PART B

The polished glass disc from Part A was tested for fluorescence intensity and decay time in a high power pulsed test system. The disc was placed in a holder and exposed to a beam of light from an EG & G model FX 12–25 xenon flashlamp. The flashlamp had a flash duration of about 20 microseconds. The disc was not observed to solarize after repeated excitation by the flashlamp. The fluorescence intensity and decay time of the excited sample was measured by photographing the oscilloscope display of the 1060 nanometer fluorescent intensity versus time on a Tektronix Model 556, Dual Trace oscilloscope connected to an RCA S-1 photomultiplier having a narrow band pass filter.

The fluorescence intensity measurement was normalized against ED-2, a glass laser composition of Owens-Illinois, Inc., comprising, in mole percent, 60.0% $SiO_2$, 2.5% $Al_2O_3$, 27.5% $Li_2O$, 10% CaO, 0.16% $CeO_2$ and 0.5% $Nd_2O_3$, disclosed in U.S. Pat. No. 3,471,409, as Example 1. The fluorescence intensity was found to be 2.47 when normalized against the glass laser composition; 2.47 times the intensity of the glass laser composition.

The fluorescence intensity was corrected for the refractive indices of the glass disc and the reference glass laser composition by $$FI \text{ (corrected)} = FI \text{ (normalized)} [(1.56)^2/(\eta \text{glass disc})^2]$$

The corrected fluorescence intensity was 1.35. The fluorescence decay time was 150 microseconds.

EXAMPLE 2

PART A

A 15 gram melt was prepared and polished glass discs prepared therefrom as described in Part A of Example 1 except the molar or weight percentages of the raw materials were as follows:

| Ingredients | Mole Percent | | Weight Percent | |
|---|---|---|---|---|
| | Host Glass | Laser Article | Host Glass | Laser Article |
| $TeO_2$ | 65.0 | 64.6 | 79.3 | 77.8 |
| ZnO | 25.0 | 24.8 | 15.5 | 15.2 |
| $B_2O_3$ | 10.0 | 9.9 | 5.2 | 5.2 |
| $Nd_2O_3$ | — | 0.7 | — | 1.8 |

The refractive index of the finished polished glass disc was measured to be 1.97.

PART B

The polished glass disc from Part A was tested for fluorescence intensity and decay time as described in Part B of Example 1. The normalized fluorescence intensity was 2.9 and the corrected fluorescence intensity was 1.77. The fluorescence decay time was 149 microseconds.

EXAMPLE 3

PART A

A 15 gram melt was prepared and polished glass discs prepared therefrom as described in Part A of Example 1 except the molar or weight percentages of the raw materials were as follows:

| Ingredients | Mole Percent | | Weight Percent | |
|---|---|---|---|---|
| | Host Glass | Laser Article | Host Glass | Laser Article |
| $TeO_2$ | 60.0 | 59.6 | 75.4 | 74.1 |
| ZnO | 30.0 | 29.7 | 19.2 | 18.8 |
| $B_2O_3$ | 10.0 | 9.9 | 5.4 | 5.3 |
| $Nd_2O_3$ | — | 0.7 | — | 1.8 |

The refractive index of the finished polished glass disc was measured to be 1.99.

PART B

The polished glass disc from Part A was tested for fluorescence intensity and decay time as described in Part B of Example 1. The normalized fluorescence intensity was 3.5 and the corrected fluorescence intensity was 2.09. The fluorescence decay time was 145 microseconds.

EXAMPLE 4

PART A

A 15 gram melt was prepared and polished glass discs prepared therefrom as described in Part A of Example 1 except the molar or weight percentages of the raw materials were as follows:

| Ingredients | Mole Percent | | Weight Percent | |
|---|---|---|---|---|
| | Host Glass | Laser Article | Host Glass | Laser Article |
| $TeO_2$ | 70.0 | 69.6 | 82.3 | 81.0 |
| ZnO | 25.0 | 24.8 | 15.0 | 14.7 |
| $B_2O_3$ | 5.0 | 4.9 | 2.7 | 2.5 |
| $Nd_2O_3$ | — | 0.7 | — | 1.8 |

The refractive index of the finished polished glass disc was measured to be 2.05.

PART B

The polished glass disc from Part A was tested for fluorescence intensity and decay time as described in Part B of Example 1. The normalized fluorescence intensity was 2.7 and the corrected fluorescence intensity was 1.52. The fluorescence decay time was 158 microseconds.

Other specific compositions set forth as being suitable for use in the present invention can be substituted for the specific glass laser compositions used in the working examples (for instance, Example 1) to provide substantially equivalent results — suitable specific compositions including those compositions in which the molar amounts of $TeO_2$, $B_2O_3$ and ZnO are defined by the area within the heavy lines connecting the points ABCDEF of the ternary diagram. Thus, a host glass composition comprising about 60 mole percent $TeO_2$, about 12 mole percent $B_2O_3$ and about 28 mole percent ZnO can be used for the specific host composition set forth in Example 1. Likewise, the specific composition of Example 1 can be substituted for by a glass host comprising about 55 mole percent $TeO_2$, 20 mole percent $B_2O_3$ and about 25 mole percent ZnO to provide substantially equivalent results.

What is claimed is:

1. A laser glass composition comprising $TeO_2$, $B_2O_3$ and ZnO, in which the amounts of moles of $TeO_2$, $B_2O_3$ and ZnO are defined by the area within the heavy lines connecting the points ABCDEF of the ternary diagram of the FIGURE, the laser glass composition also including an effective lasing amount of $Nd_2O_3$.

2. A laser glass composition as defined in claim 1 in which the proportions of $TeO_2$, $B_2O_3$ and ZnO are defined by the area formed by the lines connecting the points GHIE in the ternary diagram of the FIGURE of the drawings.

3. A laser glass composition comprising:
   1. a host glass containing about 58–67 mole percent $TeO_2$, about 0.2–12 mole percent $B_2O_3$ and about 28–34.8 mole percent ZnO; and
   2. an effective lasing amount of $Nd_2O_3$.

4. A laser glass host composition comprising about 55–80 mole percent $TeO_2$, about 0.2–20 mole percent $B_2O_3$ and about 10–35 mole percent ZnO, the host composition containing about 0.1–1.5 mole percent $Nd_2O_3$.

5. A composition as defined in claim 3 in which the host glass comprises about 80 mole percent $TeO_2$, 10 mole percent $B_2O_3$ and 10 mole percent ZnO.

6. A composition as defined in claim 3 in which the glass host comprises about 60 mole percent $TeO_2$, about 12 mole percent $B_2O_3$ and about 28 mole percent ZnO.

7. A composition as defined in claim 3 in which the glass host comprises about 55 mole percent $TeO_2$, about 20 mole percent $B_2O_3$ and about 25 mole percent ZnO.

8. A method for making glass laser articles such as rods, discs and the like, comprising the steps of:
1. melting laser glass batch-forming materials to provide a molten glass comprising $TeO_2$, $B_2O_3$ and ZnO, in which the molar proportions thereof are defined by the area within the heavy lines connecting the points ABCDEF of the ternary diagram of the FIGURE of the drawings and an effective lasing amount of $Nd_2O_3$; and
2. forming a laser article from the molten glass, the article having increased lasing efficiency.

9. A method as defined in claim 8 in which the glass comprising $TeO_2$, $B_2O_3$ and ZnO has amounts thereof defined by the area within the lines connecting the points GHIE of the ternary diagram of the FIGURE of the drawings.

10. The new use for a glass composition comprising $TeO_2$, $B_2O_3$ and ZnO in which the molar proportions of $TeO_2$, $B_2O_3$ and ZnO are defined by the area within the heavy lines connecting the points ABCDEF in the ternary diagram of the FIGURE of the drawings, and which glass composition is a host for an effective lasing amount of $Nd_2O_3$, the new use comprising the steps of:

1. forming a glass article from the glass compositions;

2. pumping the laser article to provide energy inversion; and 3. lasing the pumped laser article.

11. A glass laser article made from the composition defined in claim 1.

12. A glass laser article as defined in claim 11 in the form of a rod.

13. A glass laser article as defined in claim 11 in the form of a disc.

14. A glass laser article made according to the method defined in claim 8.

* * * * *